(12) United States Patent
Kupratis

(10) Patent No.: US 9,021,778 B2
(45) Date of Patent: May 5, 2015

(54) DIFFERENTIAL GEAR SYSTEM WITH CARRIER DRIVE

(75) Inventor: Daniel B. Kupratis, Wallingford, CT (US)

(73) Assignee: United Technologies Corporation, Hartford, CT (US)

(*) Notice: Subject to any disclaimer, the term of this patent is extended or adjusted under 35 U.S.C. 154(b) by 923 days.

(21) Appl. No.: 13/170,574

(22) Filed: Jun. 28, 2011

(65) Prior Publication Data

US 2013/0000323 A1 Jan. 3, 2013

(51) Int. Cl.
*F02C 7/36* (2006.01)
*F02C 3/113* (2006.01)
*F02C 3/107* (2006.01)
*F16H 1/28* (2006.01)

(52) U.S. Cl.
CPC . *F02C 7/36* (2013.01); *F02C 3/113* (2013.01); *F02C 3/107* (2013.01); *F05D 2260/40311* (2013.01); *F16H 2001/289* (2013.01)

(58) Field of Classification Search
CPC .......... F02C 3/067; F02C 3/107; F02C 3/113; F02C 7/36; F05D 2260/40311; F02K 3/04; F02K 3/06; F02K 3/072; F02K 3/062; F02K 3/065
USPC ................ 60/226.1, 39.15, 791–792, 39.162, 60/39.163
See application file for complete search history.

(56) References Cited

U.S. PATENT DOCUMENTS

| | | |
|---|---|---|
| 3,611,834 A | 10/1971 | Dison |
| 3,729,957 A | 5/1973 | Petrie et al. |
| 3,853,432 A | 12/1974 | Cronstedt |
| 4,251,987 A | 2/1981 | Adamson |
| 4,446,696 A | 5/1984 | Sargisson et al. |
| 4,751,816 A | 6/1988 | Perry |
| 4,817,382 A | 4/1989 | Rudolph et al. |
| 4,829,850 A | 5/1989 | Soloy |
| 4,947,642 A * | 8/1990 | Grieb et al. ................. 60/226.1 |
| 5,010,729 A | 4/1991 | Adamson et al. |
| 5,102,379 A | 4/1992 | Pagluica et al. |
| 5,107,676 A | 4/1992 | Hadaway et al. |
| 5,485,717 A | 1/1996 | Williams |
| 6,223,616 B1 | 5/2001 | Sheridan |
| 6,381,948 B1 | 5/2002 | Klingels |
| 6,735,954 B2 | 5/2004 | MacFarlane et al. |
| 7,144,349 B2 | 12/2006 | Mitrovic |
| 7,223,197 B2 | 5/2007 | Poulin et al. |
| 7,363,757 B2 * | 4/2008 | Loisy .......................... 60/226.1 |
| 7,788,898 B2 | 9/2010 | Kern et al. |
| 7,791,235 B2 | 9/2010 | Kern et al. |
| 7,841,165 B2 | 11/2010 | Orlando et al. |
| 7,882,691 B2 | 2/2011 | Lemmers, Jr. et al. |
| 7,921,634 B2 | 4/2011 | Orlando et al. |
| 7,926,259 B2 | 4/2011 | Orlando et al. |
| 2009/0090096 A1 | 4/2009 | Sheridan |

FOREIGN PATENT DOCUMENTS

GB 1278570 10/1970
WO 2006059970 A2 6/2006

* cited by examiner

*Primary Examiner* — Andrew Nguyen
(74) *Attorney, Agent, or Firm* — Kinney & Lange, P.A.

(57) ABSTRACT

A differential gear system for a gas turbine engine includes an assembly of a ring gear, a sun gear, and a plurality of planet gears, and a planet carrier. The plurality of planet gears are enmeshed between the ring gear and the sun gear. The planet carrier acts as an input to rotatably drive the planet gears, the sun gear, and ring gear of the gas turbine engine.

8 Claims, 4 Drawing Sheets

DIFFERENTIAL GEAR SYSTEM WITH CARRIER DRIVE

BACKGROUND

The present invention relates to gas turbine engines, and more particularly, to a differential gear system for use in gas turbine engines.

Gas turbine engines include compressors in flow communication with one another. The compressors are disposed upstream of a combustor and high and low speed turbines. The components are disposed about a centerline axis of the gas turbine engine in flow communication with one another. The low pressure compressor is driven by the low speed turbine while the high pressure compressor is driven by the high speed turbine. This process is achieved by air, which is compressed by the compressors, and is then is mixed with fuel and ignited in the combustor to generate hot combustion gases that flow along and turn the high and low speed turbines. The low and high speed turbines not only drive the low and high pressure compressors and produce thrust, but also can be harnessed to produce power that can be used for auxiliary purposes.

Because the rotating components of gas turbine engines require different speeds and power parameters in order to achieve greater efficiencies, gas turbine engines typically operate with high pressure spools comprising the combustor, the high pressure compressor and the high speed turbine (coupled together by a high speed shaft). The high pressure spool is ideal for driving electrical generators, in addition to the high pressure compressor.

Similarly, gas turbine engines use one or more arrays of fans to accelerate the bypass air through a fan section and thereby produce a significant portion of the thrust output for the engine. However, the rotational speed of the fans within the gas turbine engine is limited, and is much slower than that of the core compressor. Thus, gas turbine engines may have a low pressure spool that is coupled to the fan via a gearbox, the low pressure spool comprising the low pressure compressor and low speed turbine (coupled together by a low speed shaft).

For efficiency reasons it is desirable for gas turbine engines to utilize an intermediate pressure turbine to drive a generator independently. Such an arrangement can be achieved by the use of gear assemblies such as epicyclic gear systems. Epicyclic gear systems are complex mechanisms for reducing or increasing the rotational speed between two rotating shafts or rotors. The compactness of planetary or star system type epicyclic gear systems makes them appealing for use in aircraft engines.

Although not unknown in gas turbine engines, the use of differential epicyclic gear systems, where none of the differential elements such a sun gear, ring gear, planet gears, and a planet carrier are tied to a stator ground, is not prevalent. The lack of general application of differential gear systems in gas turbine engines can in part be attributed to conventional differential gear systems inability to provide for a stable and predictable direction of rotation for shafts and rotors coupled thereto. Therefore, during operation of the gas turbine engine an undesirable direction of rotation for the rotors and shafts (and components coupled thereto) can result if a conventional differential gear system is utilized.

SUMMARY

A differential gear system for a gas turbine engine includes an assembly of a ring gear, a sun gear, and a plurality of planet gears, and a planet carrier. The plurality of planet gears are enmeshed between the ring gear and the sun gear. The planet carrier acts as an input to rotatably drive the planet gears, the sun gear, and ring gear of the gas turbine engine.

In another aspect, a gas turbine engine includes a differential gear system, an intermediate speed shaft, an epicyclic gear system, and an intermediate speed turbine. The differential gear system has a planet carrier, a ring gear, a sun gear, and a plurality of planet gears enmeshed between the ring gear and sun gear. The planet carrier acts as an input to rotatably drive the planet gears, the sun gear, and ring gear. The intermediate speed shaft is coupled to and drives the planet carrier and the epicyclic gear system couples the intermediate speed shaft to the intermediate speed turbine.

A method for transferring torque from an intermediate speed turbine to a first and a second rotating shaft of a gas turbine engine, the method includes a differential gear system that has a planet carrier, a ring gear, a sun gear, and a plurality of planet gears enmeshed between the ring gear and sun gear. The method includes a first shaft coupled to the sun gear and a second shaft coupled to the ring gear. The planet carrier acts as an input for torque to rotatably drive the planet gears, the sun gear, and ring gear. The method uses an intermediate speed shaft coupled to both the intermediate speed turbine and the planet carrier to provide torque to the planet carrier.

DETAILED DESCRIPTION

Figure 1:
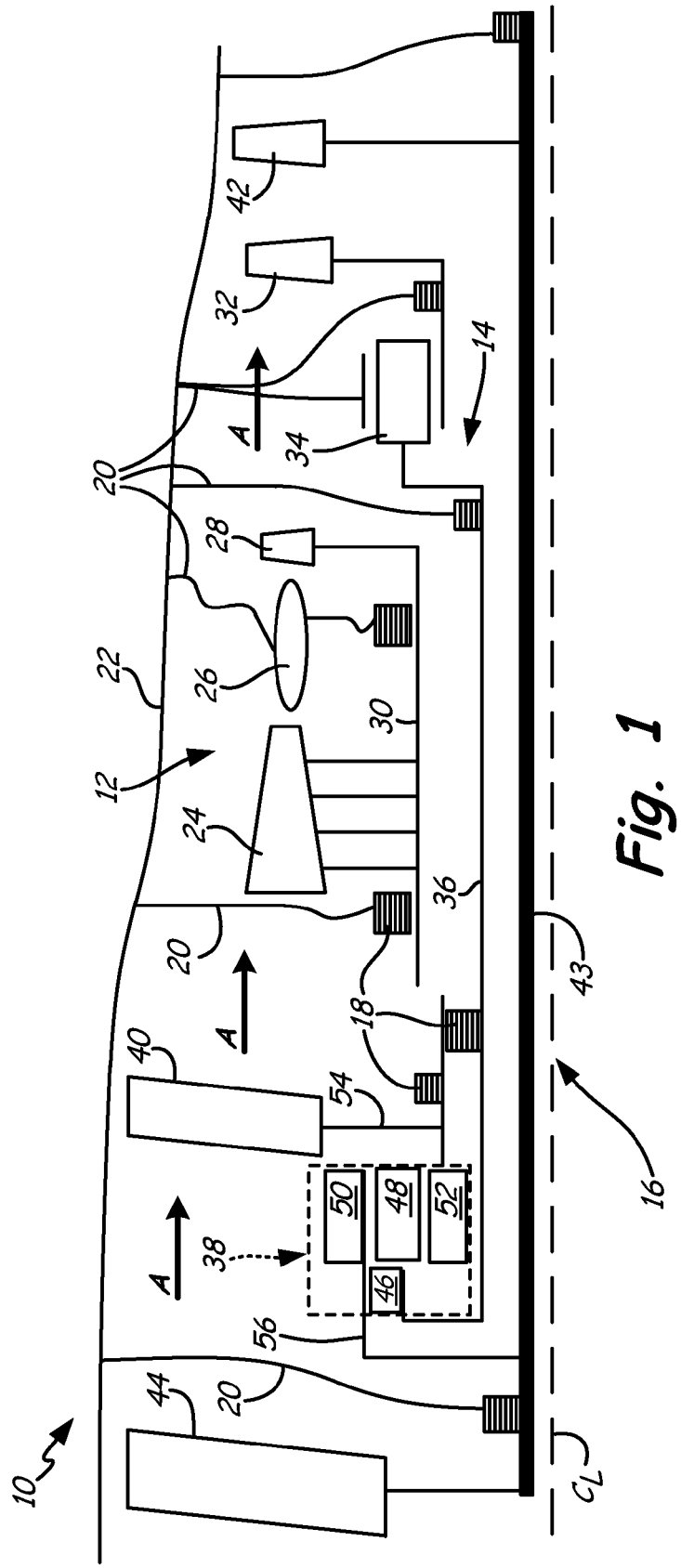
FIG. 1 is a schematic cross-sectional view of half of a gas turbine engine utilizing a differential gear system.

FIG. 1 is a highly schematic cross-sectional view of one half of a gas turbine engine 10 taken above the centerline $C_L$. Gas turbine engine 10 includes a high pressure spool 12, an intermediate pressure spool 14, a low pressure spool 16, bearings 18, struts 20, and a casing 22. High pressure spool 12 includes a high pressure compressor 24, a combustor 26, a high speed turbine 28, and a high speed shaft 30. Intermediate pressure spool 14 includes an intermediate speed turbine 32, an epicyclic gear system 34, an intermediate speed shaft 36, a differential gear system 38, and a low pressure compressor 40. Low pressure spool 16 includes a low speed turbine 42, a low speed shaft 43, and a fan 44. The differential gear system 38 includes a planet carrier 46, planet gears 48, a ring gear 50, and a sun gear 52. Sun gear 52 is connected by a shaft 54 to low pressure compressor 40. Ring gear 50 is connected by a shaft 56 to low speed shaft 43.

The general construction and operation of gas turbine engines is well-known in the art, and therefore will not be discussed in great detail. As shown in FIG. 1, high pressure spool 12, intermediate pressure spool 14, and low pressure spool 16 are supported and allowed to rotate by bearings 18 and struts 20 within casing 22. High pressure spool 12, intermediate pressure spool 14, and low pressure spool 16 are arranged in flow communication with one another.

As shown in FIG. 1, high pressure spool 12 is of conventional construction and operates in a conventional manner. Thus, high pressure compressor 24 is arranged downstream of forward portions of intermediate pressure spool 14 and low pressure spool 16 as indicated by flow arrows A. High pressure compressor 24 is coupled to high speed shaft 30 and disposed upstream of combustor 26. High speed turbine 28 is disposed downstream of combustor 26 and is coupled to and drives high pressure compressor 24 via high speed shaft 30. The aforementioned components are arranged in flow communication. Thus, gas passing through high pressure spool 12 is compressed by high pressure compressor 24 and is then is mixed with fuel and ignited in combustor 26 to generate hot combustion gases that flow past and turn high speed turbine 28 (which turns high pressure compressor 24).

Intermediate pressure spool 14 has components arranged both upstream and downstream of high pressure spool 12 and is in flow communication therewith. More particularly, intermediate speed turbine 32 is disposed downstream of high speed turbine 28. Intermediate speed turbine 28 is coupled to intermediate speed shaft 36 via epicyclic gear system 34. Epicyclic gear system 34 can be of conventional construction and can comprise a planetary or star system type epicyclic gear system as known in the art and described in U.S. Pat. Nos. 6,223,616 and 5,102,379, which are herein incorporated by reference.

Intermediate speed shaft 36 is coupled to epicyclic gear system 34 and is shafted to differential gear system 38. Differential gear system 38 acts to couple multiple shafts including shaft 54, which is coupled to low pressure compressor 40. Low pressure compressor 40 is disposed upstream of and in fluid communication with the high pressure compressor 24. In addition to compressing core air prior to further compression in the high pressure compressor 24, in some embodiments low pressure compressor 40 can act to drive a bypass fan at a higher rate of rotational speed than fan 44.

Intermediate pressure spool 14 acts in combination with high pressure spool 12 to produce power and thrust. More particularly, during operation gas passing into low pressure compressor 40 is compressed and then compressed further by high pressure compressor 24 and is then mixed with fuel and ignited in combustor 26 to generate hot combustion gases that flow past and turn intermediate speed turbine 32 (which turns low pressure compressor 40).

Low pressure spool 16 acts to drive fan 44 to produce a substantial amount of thrust for the gas turbine engine 10. Fan 44 is coupled to slow speed turbine 42 via slow speed shaft 43. In the embodiment shown in FIG. 1, slow speed turbine 42 directly drives fan 44 without intermediate gearing. In other embodiments, intermediate gearing such as epicyclic gear systems can be used to change the rotational speed of fan 44 relative to that of slow speed turbine 42. Shaft 56 from differential gear system 38 couples to slow speed shaft 43. Thus, fan 44 is driven by ring gear 50 of epicyclic gear system 38 as well as by slow speed turbine 42 via slow speed shaft 43.

Highly schematic FIG. 1 illustrates some of the elements of differential gear system 38. The illustrated elements include planet carrier 46, planet gears 48 (only a single planet gear 48 is shown in FIG. 1), ring gear 50, and sun gear 52. As will be discussed in further detail subsequently, planet carrier 46, planet gears 48, sun gear 52, and ring gear 50 interact with one another to transfer torque, power, and speed and couple multiple shafts 36, 54, and 56 all of which are rotating at different rotational speeds.

Planet carrier 46 is coupled to and is driven by intermediate speed shaft 36. More particularly, intermediate speed shaft 36 acts as a torque, speed, and power input to planet carrier 46 of differential gear system 38. Thus, planet carrier 46 acts as the input for torque, speed, and power to drive the other elements of differential gear system 38. Such an arrangement allows planet carrier 46 to act as a fulcrum between sun gear 52 and ring gear 50 and provides for a stable and predictable direction of rotation for sun gear 52 (and hence a predictable and desired direction of rotation for low pressure compressor 40), and ring gear 50 (and hence a predictable and desired direction of rotation for fan 44). Thus, fan 44 and low pressure compressor 40 cannot reverse directions of rotation in an undesirable manner.

Sun gear 52 is coupled to and rotates shaft 54, which in turn rotates low pressure compressor 40. Similarly, ring gear 50 is coupled to and rotates shaft 56, which is coupled to low speed shaft 43. Together, ring gear 50 and low speed turbine 42 act to drive fan 44 via low speed shaft 43.

Figure 2:
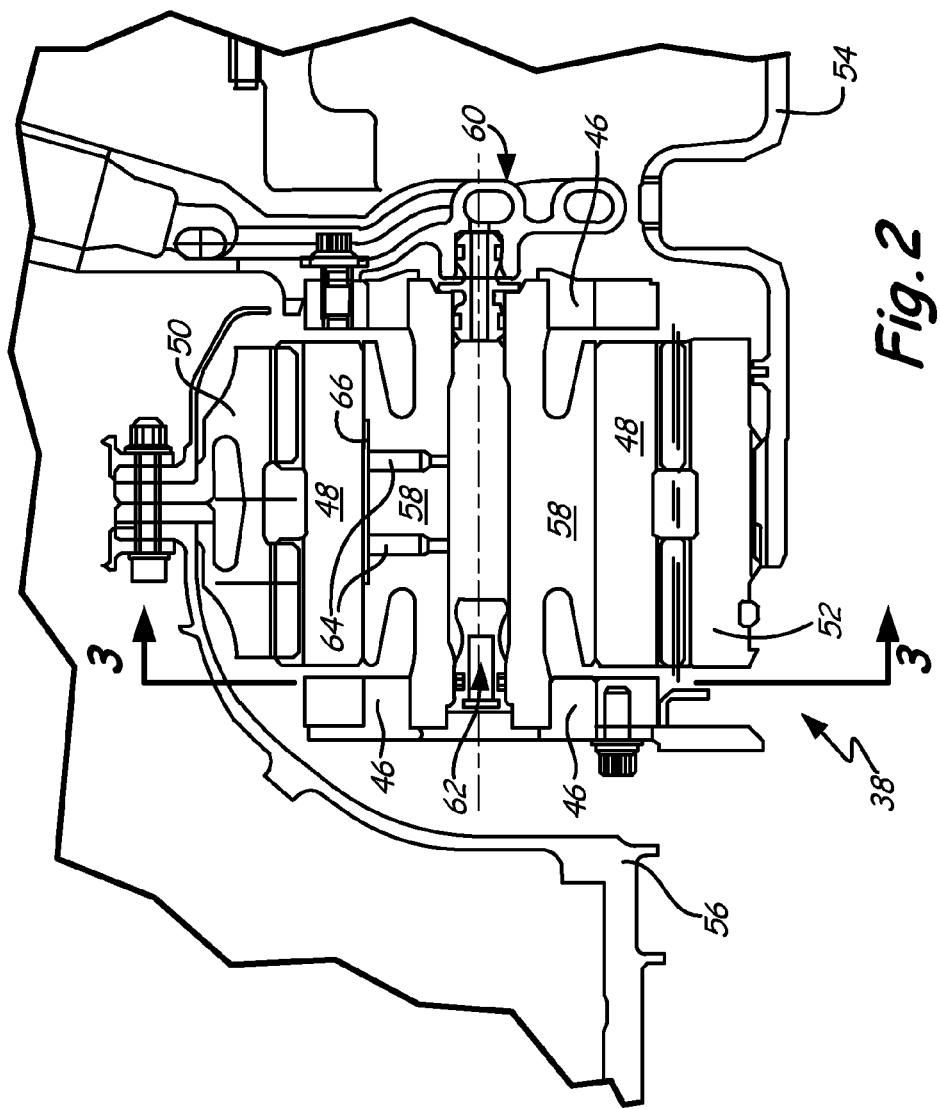
FIG. 2 is a schematic cross-sectional view of one embodiment of the differential gear system of FIG. 1.

FIG. 2 is a cross-sectional view of differential gear system 38 taken through only a single planet gear 48. As discussed previously, differential gear system 38 includes multiple planet gears 48 arranged circumferentially around sun gear 52. In addition to planet carrier 46, planet gear 48, ring gear 50, and sun gear 52, epicyclic gear system 38 includes journal bearings 58 (again only a single journal bearing is shown in the section illustrated in FIG. 2) and lubricant manifold 60. Journal bearing 58 includes axial passage 62, radial passages 64, and distribution recess 66.

As discussed previously, differential gear system 38 acts to transfer torque, power, and speed and couple multiple shafts 36, 54, and 56, all of which are rotating at different rotational speeds. Planet carrier 46 is attached to and rotates with intermediate speed shaft 36 (FIG. 1). Planet carrier 46 has two generally interfacing faces which are press fit or otherwise connected to the ends of the journal bearings 58. In this manner planet carrier 46 supports journal bearings 58. Sun gear 52 is coupled to and drives shaft 54, which turns low pressure compressor 40. Ring gear 50 is coupled to and drives shaft 56, which couples to low speed shaft 43 (FIG. 1).

Planet gears 48 are enmeshed between sun gear 52 and ring gear 50 and are rotated relative to ring gear 50 and sun gear 52 by planet carrier 46. Thus, planet gears 48 are driven by planet carrier 46 to rotate sun gear 52 and ring gear 50.

Planet gears 48 are rotatably mounted on journal bearings 58. Thus, as will be discussed subsequently, when intermediate speed shaft 36 (FIG. 1) rotates, planet gears 48 are caused to rotate. The rotation of the planet gears 48 drives sun gear 52 and ring gear 50 which cause shaft 54 and shaft 56 to rotate at desired rotational velocities that are appropriate for low pressure compressor 40 and fan 44, respectively.

In the embodiment shown in FIG. 2, journal bearing 58 is positioned inside of planet gear 48. Lubricant manifold 60 is disposed adjacent to journal bearing 58 and is fluidly connected thereto. Planet gear 48 is rotatably mounted relative to planet carrier 46 by journal bearing 58.

Journal bearing 58 has axial passage 62 that extends therethrough. Axial passage 62 comprises a central cavity that is fluidly connected to lubricant manifold 60. Lubricant manifold 60 is fed pressurized lubricant from other components of gas turbine engine 10. Liquid lubricant from lubricant manifold 60 is supplied through axial passage 62 to radial passages 64 via means of a hollow configured pin and a fitting which interfaces the pin. After leaving axial passage 62, the lubricant flows through radial passages 64 into distribution recess 66 between journal bearing 58 and associated planet gear 48. Distribution recess 66 extends along the exterior surface of journal bearing 58. The lubricating liquid forms a film of lubrication on journal bearing 58 in the distribution recess 66. From distribution recess 66 the film of lubrication spreads circumferentially and axially due to viscous forces between planet gear 48 and journal bearing 58. The lubricant film helps to support planet gear 48 and reduce friction between the interior surface of planet gear 48 and the exterior surface of journal bearing 58. To ensure adequate thickness of the lubricant film, the rate the lubricant is fed to the external surface of the journal bearing 58 varies and is determined by the pressure profile and temperature at the interface between planet gears 48 and associated journal bearings 58.

Figure 3:
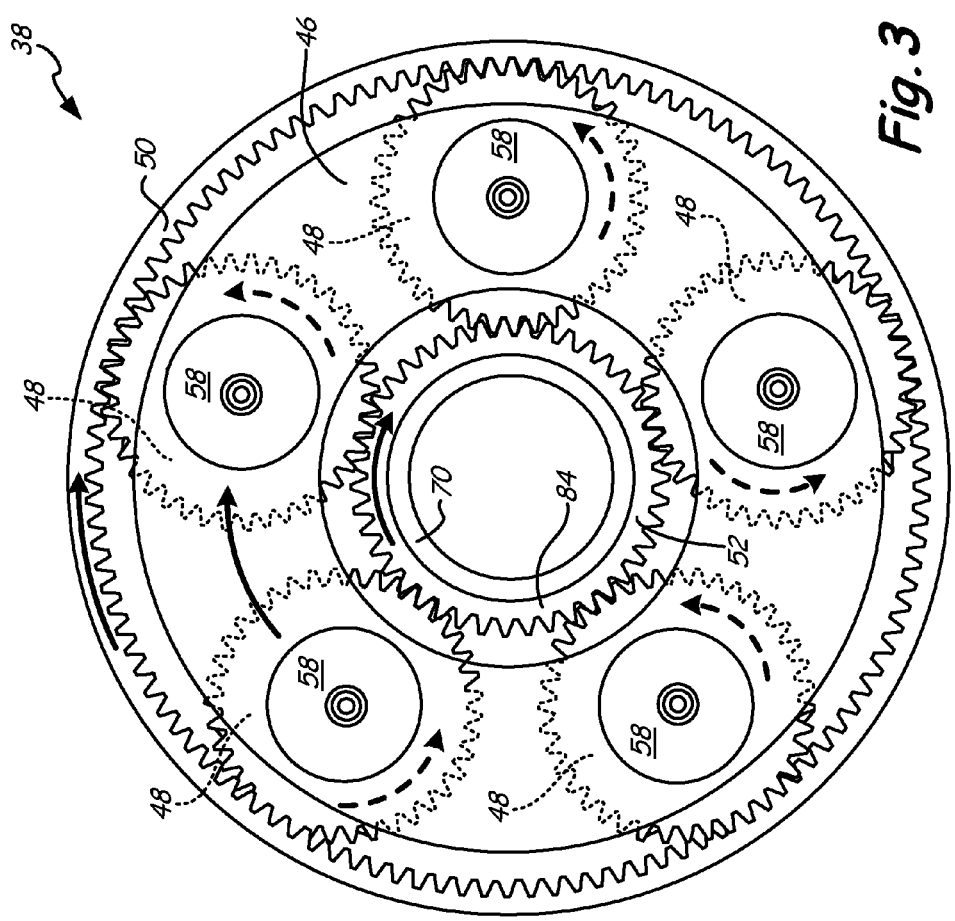
FIG. 3 is a diagrammatic view of the entire differential gear system taken along section 3-3 of FIG. 2.

FIG. 3 shows a schematic view of the differential gear system 38 taken along section 3-3 of FIG. 2. Thus, FIG. 3 shows a plurality of planet gears 48. Planet gears 48 are mounted on planet carrier 46 by the journal bearings 58. Planet carrier 46 is disposed at interfacing ends of differential gear system 38 (only one end of planet carrier 46 is illustrated in FIG. 3). Planet carrier 46 is disposed adjacent ring gear 50 and sun gear 52. Ring gear 50 surrounds planet gears 48 and sun gear 52.

As discussed previously with reference to FIG. 2, planet gears 48 are enmeshed between sun gear 52 and ring gear 50 and are rotated within (and relative to) ring gear 50 and sun gear 52 by planet carrier 46. Thus, planet gears 48 are driven by planet carrier 46 to drive both sun gear 52 and ring gear 50. Planet carrier 46 in turn is driven by intermediate speed shaft 36 (FIG. 1).

FIG. 3 shows the direction of rotation of differential gear system 38 elements. In particular, when planet carrier 46, which acts as the input to the remaining elements, is rotated in a clockwise direction as shown, planet gears 48 also rotate in a counterclockwise direction within ring gear 50 and relative to sun gear 52. Similarly, sun gear 52 will be driven by planet gears 48 to rotate in a clockwise direction as will ring gear 50. In other embodiments, planet carrier 46 can be driven in a counterclockwise manner, which would result in ring gear 50 and sun gear 52 rotating in a predictable and dependable counterclockwise manner as desired.

Figure 4:
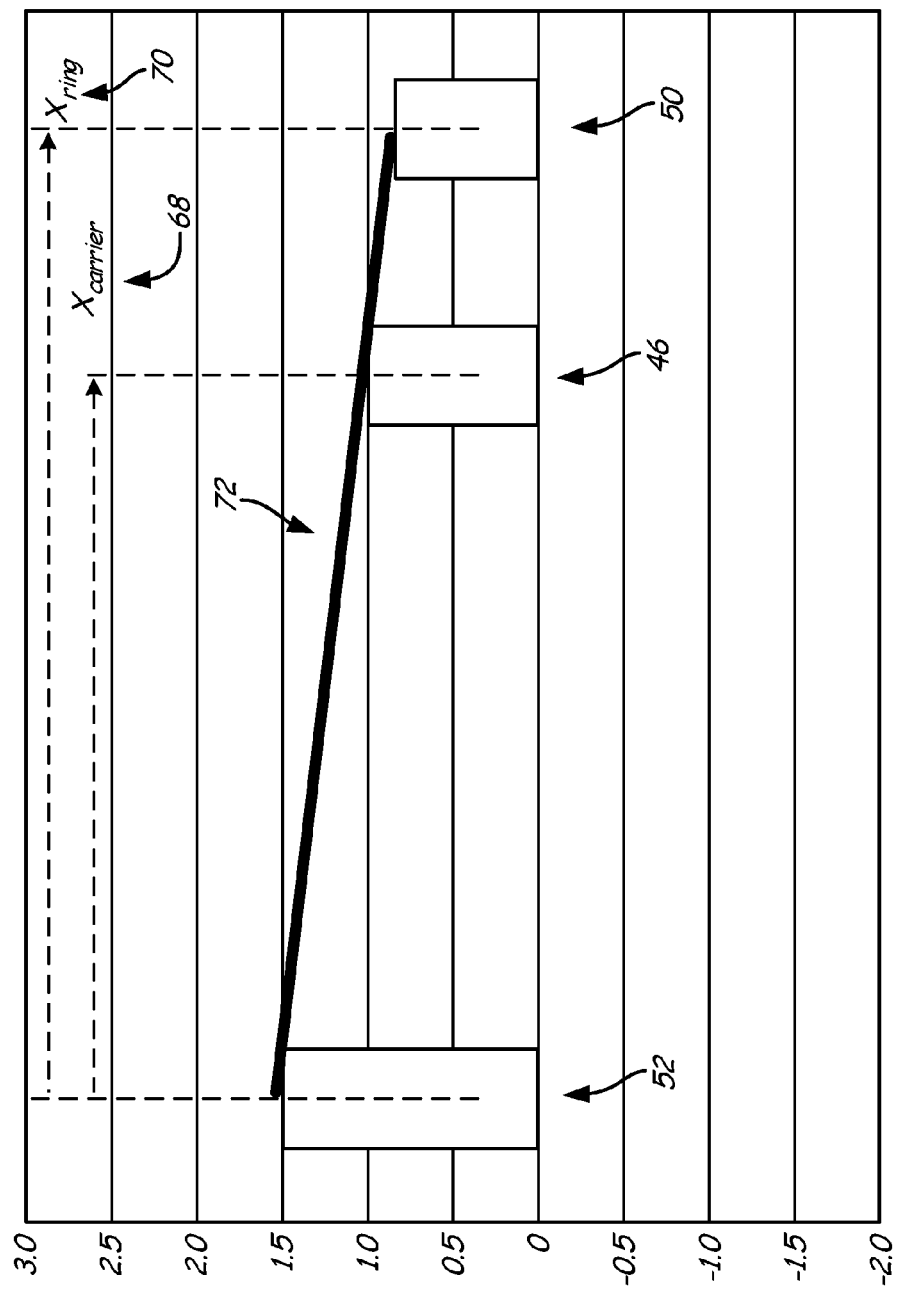
FIG. 4 is a plot of the geometry ratios and rotational speeds of elements of the differential gear system in non-dimensionalized units.

FIG. 4 shows geometry ratios 68 and 70 and a rotational speed plot 72 of planet carrier 46, ring gear 50, and sun gear 52 of differential gear system 38 in non-dimensionalized units. Geometry ratio 68, X(carrier), represents the ratio of the radius (or diameter) of the ring gear 50 with respect to the radius (or diameter) of the sun gear 52. Similarly, geometry ratio 70, X(ring), represents the sum of the radius (or diameter) of the ring gear 50 plus the radius (or diameter) of the sun gear 52 with respect to the radius (or diameter) of the sun gear 52. The desired geometry ratios 68 and 70 to achieve a desired rotational speed for sun gear 52 and ring gear 50 are determined using the following equation (1): (1) $X(carrier)/X(ring)=gr/(1+gr)$, where $gr=RADIUS(ring)/RADIUS(sun)$ Because planet carrier 46 acts a fulcrum for ring gear 50 and sun gear 52, rotational speed plot 72 can be generated using the input rotational speed of the planet carrier 46 (which is known). If one of the geometry ratios 68 or 70 is known, the rotational speed of ring gear 50 (and hence shaft 56, which in turn couples to low speed shaft 43 (FIG. 1)) can be determined and the rotational speed of sun gear 52 (and hence shaft 54 which turns low pressure compressor 40 (FIG. 1)) can be determined. For example, given a non-dimensional input speed of 1.0 for planet carrier 46, and a known gr ratio of 3.0, the X(carrier)/X(ring) would be 0.75. Thus, the rotational speed of ring gear 50 would be 0.83 times less than that of the input speed (1.0) of planet carrier 46. The rotational speed of sun gear 52 would be 1.5 times greater than that of the input speed (1.0) of planet carrier 46.

Equation (1) also allows for the appropriate relative sizes (radii) of differential gear system 38 elements to be determined based on a given input rotational speed of planet carrier 46 and desired output rotational speeds for sun gear 52 and ring gear 50. Rotational speed is determined by the relation: $r=v/(2\pi f)$, where v=the known speed of the element in question (sun gear 52 or ring gear 50), f=frequency in revolutions/second and r=the radius of the element (sun gear 52 or ring gear 50) to be determined.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A method for transferring torque from an intermediate speed turbine to a first and a second rotating shaft of a gas turbine engine, the method comprising the steps of:
   driving the intermediate speed turbine with combustion gases of the gas turbine engine;
   transferring torque through an intermediate speed shaft from the intermediate speed turbine to a planet carrier of a differential gear system, the differential gear system additionally having a ring gear, a sun gear, and a plurality of planet gears enmeshed between the ring gear and sun gear, wherein the intermediate speed shaft is coupled to the intermediate speed turbine via an epicyclic gear system, and wherein the intermediate speed shaft is coupled to and drives the planet carrier, and wherein the planet carrier acts as an input to rotatably drive the planet gears, the sun gear, and the ring gear;
   transferring torque from the planet carrier through the ring gear to the second shaft, wherein the second shaft is coupled to and driven by the ring gear, and wherein the second shaft is coupled to and rotates a fan of the gas turbine engine, and wherein the second shaft couples to a low speed shaft and the low speed shaft is also driven by a low speed turbine of the gas turbine engine; and
   transferring torque from the planet carrier through the sun gear to the first shaft, wherein the first shaft is coupled to and driven by the sun gear, and wherein the first shaft is coupled to and rotates a low pressure compressor of the gas turbine engine.

2. The method of claim 1, wherein the planet carrier, the sun gear, and the ring gear rotate at different rotational speeds.

3. The method of claim 1, wherein the intermediate speed shaft and the first shaft are part of an intermediate pressure spool of the gas turbine engine.

4. A gas turbine engine, comprising:
   a differential gear system having a planet carrier, a ring gear, a sun gear, and a plurality of planet gears enmeshed between the ring gear and sun gear, the planet carrier acting as an input to rotatably drive the planet gears, the sun gear, and the ring gear of the gas turbine engine;
   an intermediate speed shaft that is coupled to and drives the planet carrier;
   an epicyclic gear system coupling the intermediate speed shaft to an intermediate speed turbine;
   a first shaft coupled to and driven by the sun gear, wherein the first shaft is coupled to and rotates a low pressure compressor of the gas turbine engine; and
   a second shaft coupled to and driven by the ring gear, wherein the second shaft is coupled to and rotates a fan of the gas turbine engine, and wherein the second shaft couples to a low speed shaft and the low speed shaft is also driven by a low speed turbine of the gas turbine engine.

5. The gas turbine engine of claim 4, wherein the planet carrier, the planet gears, the sun gear, and the ring gear are not tied to a stator ground.

6. The gas turbine engine of claim 4, further comprising a journal bearing disposed within and extending from each of the planet gears, the journal bearing supported at one end by the planet carrier.

7. The gas turbine engine of claim 4, wherein the epicyclic gear system is a planetary or star system type gear system.

8. The gas turbine engine of claim 4, wherein the gas turbine engine has a high pressure spool, an intermediate pressure spool, and a low pressure spool.

\* \* \* \* \*